Patented Sept. 19, 1944

2,358,313

UNITED STATES PATENT OFFICE 2,358,313

SYNTHETIC ABRASIVE MATERIAL

John A. Brown, St. Paul, Minn., assignor to Minnesota Mining & Manufacturing Company, St. Paul, Minn., a corporation of Delaware No Drawing. Application February 23, 1940,
Serial No. 320,453

11 Claims. (Cl. 51—309)

This invention relates to a new material and particularly to a new material which may be prepared artificially or synthetically from known materials. More particularly the present invention concerns the production of a synthetic material having special utility as an abrasive.

Heretofore various naturally occurring materials have been employed as abrasives, including such materials as emery, flint, garnet, corundum, etc. One difficulty with these naturally occurring materials is that various shipments of the same may vary substantially in quality or characteristics. Another difficulty is that, to secure natural mineral abrasives of the desired type, it is frequently necessary to transport such mineral material for long distances. For example, in order to secure an abrasive product which is satisfactory for many uses, it is common to import emery which is mined on the Asiatic mainland of Turkey.

One of the objects of the present invention is to produce a synthetic abrasive material which is superior in quality to normal emery or normal flint abrasives and which can be used to replace the highest grades of imported emery. Another object is to provide an abrasive material at a lower cost than high grade Turkish emery. A further object is to provide an abrasive product of quality comparable to or even better than that of garnet. A supplemental object is to produce an abrasive material which is less expensive than abrasives produced from naturally occurring garnets of suitable grade. A further object is to produce a material in which the particles are composed of a fused or vitrified matrix having relatively small sized particles disseminated therein. A further object is to produce a material of the type last-mentioned, adapted for use as an abrasive, in which the disseminated particles have a substantially different hardness than the matrix. Occording to a preferred aspect of the present invention, it is an object to have a new synthetic abrasive material comprising a fused or vitrified matrix having disseminated therein particles of a substantially greater hardness than that of the matrix. It is a further object of this invention to provide a new and advantageous method of making such material. A further object is to produce a new synthetic material which may be used for any purpose desired. Another object is to utilize waste materials of commerce. A still further object is to provide a new synthetic abrasive material having improved adhesion to bonding materials, such as are employed in making sandpaper, abrasive belts, abrasive discs and the like. These and other objects and advantages will appear from the description taken as a whole.

Illustrative of a specific suitable method of making my synthetic material, an intimate mixture of aluminum oxide and garnet (preferably secured by employing aluminum oxide fines and garnet fines of the size of a hundred microns and finer) are introduced into a rotating smelting furnace or kiln, which may be fired with oil or any other suitable fuel and may have a brick or ceramic lining. According to a suitable process of making my synthetic material, the rotary furnace or kiln was first fired for two hours so that the wall temperatures of the furnace were of the order to 1400° to 1600° C. Then, in order to protect the lining, a several hundred pound batch of 7/0, and finer, aluminum oxide was introduced into the furnace and rotated and heated in the furnace to the sintering point of the aluminum oxide fines, which coated the fire brick walls of the kiln to a thickness of about 2 inches. With the heat still being applied, the extra fine non-adhering sintered aluminum oxide is discharged from the furnace. In order to hold this aluminum oxide lining, it is desirable to maintain a high wall temperature. A several hundred pound batch (e. g. 500 lbs.) of mixed aluminum oxide fines and garnet fines of a hundred microns in size and smaller were then introduced into the firing end of the furnace and the firing was continued and the furnace slowly rotated, e. g. about 3 R. P. M A suitable desired ratio of aluminum oxide fines and garnet fines, as employed, was 60% by weight of 5/0 and finer aluminum oxide grains and 40% by weight of 7/0 and finer almandite garnet grains. These fines may be thoroughly mixed together, either by rotation through bins or by mixing in a mixer of the type of a concrete mixer, or by other suitable means, before introduction into the rotating furnace or kiln. The mixing is carried out with the minerals dry and intimate admixture of the above minerals is facilitated by the fact that they have approximately the same specific gravity.

The heating of the rotating smelting furnace or kiln is continued after the introduction of the mixed fines, and a suitably high temperature is maintained, so that the garnet of the mix vitrifies or fuses and agglomerates the aluminum oxide fines and preferably reacts with surfaces of the aluminum oxide particles to an appreciable extent. As a result, a multiplicity of various size balls will be formed by rotation of the furnace, varying in size from about ¼ to 6 inches in diameter. This material is emptied from the furnace, cooled to a suitable temperature for handling, e. g. to room temperature, and then may be crushed and graded in the manner well known in the art of making mineral abrasives.

The resulting abrasives particles, thus produced, upon careful macroscopic examination, and especially upon microscopic examination, will be seen to comprise a fused or vitrified matrix having particles disseminated therein. The matrix, derived largely from the garnet fines, is studded with, for example, partially reacted aluminum oxide fines, which remained unmelted and disseminated throughout the matrix. In general appearance, the material commonly resembles natural Turkish emery.

The garnet employed in the above illustration is a metamorphic non-carbonaceous siliceous material ordinarily having a hardness of 7 to 7.5, Mohs scale, more or less. The aluminum oxide ordinarily has a hardness greater than 9 and usually in the range of 9.4 to 9.6, or higher, e. g. 9.5.

While as above stated, the temperature employed in making my synthetic material is sufficient to vitrify or fuse the garnet fines, and can be determined by trial and error or by any suitable observation or measurement, based upon this criterion, usually such temperature will be in the range of 1200° or 1300° to 1600° C. but may be higher or lower, depending upon the particular nature of the materials charged and the particular result desired.

My synthetic material, produced for example as above illustrated, when crushed and graded to suitalbe size so that the same may be employed as abrasive grits or particles, provides abrasive particles having rough or pitted surfaces which aid in forming a very firm bond with abrasive bonding materials, particularly synthetic resins, such as, phenolic resins, China-wood oil-Bakelite varnish resins, urea-aldehyde resins and other materials commonly employed as bonds in making sandpaper, abrasive belts and other abrasive articles. Abrasive granules thus produced have a hardness at least of the order of 8 (Mohs scale) and frequently harder. The very finely divided particles which are disseminated in the vitrified or fused matrix have a hardness greater than that of the matrix, the hardness of the disseminated particles and that of the matrix differing by at least about 1½ to 2 points on the Mohs scale.

One of the important tests to which commercial sandpaper and abrasive belts is subjected is the grain retention test, i. e. ability of the abrasive article to resist the loss of abrasive grains when subjected to an abrading operation. This problem is often quite troublesome where the bond employed is a synthetic resin, e. g. a pure phenolic or phenol-aldehyde resin or a China-wood oil-Bakelite type of resin. It is one of the purposes of the present invention to improve sandpaper and abrasive articles generally, but especially abrasive articles involving such bonds and other bonds where the problem of grain retention exists. Because of the uniform quality of my product, abrasive articles such as sandpaper, abrasive discs, molded abrasive wheels and the like may be better controlled in quality, since the variable factor customarily suffered in connection with abrasive grains produced from naturally occurring mineral materials has been minimized or substantially eliminated.

While various synthetic resinous compositions suitable for use as abrasive bonds are well known to those skilled in this art, an illustrative phenol-formaldehyde type of resin is that disclosed in the copending application of Byron J. Oakes, Serial No. 293,192, page 14. Other contemplated synthetic resins are also disclosed in said copending Oakes application.

Also China-wood oil-Bakelite types of resins used in making sandpaper are known to those skilled in this art. However one contemplated resin of this type is made by adding one part of an oil-soluble Bakelite resin (e. g. Bakelite XR 820) to 2.5 to 3 parts of heated China-wood oil, the Bakelite being cooked into the China-wood (or linseed) oil until a smooth, satisfactory material is attained for coating on a cloth, paper or like backing.

While I have illustrated a preferred and advantageous selection of raw materials and a suitable method of treating and reacting the same to produce my synthetic product, of course it will be understood that the present invention is not limited thereto. For example, in place of garnet fines, I may employ other fusible silicates or silicate rock forming materials, such as basic igneous rocks, and/or metamorphic derivatives thereof, and argillaceous ferruginous quartzites, or the like, having suitably low melting or softening points. I also contemplate the use of mixtures of garnet fines and another siliceous or silica-containing material, such as those just named. In place of the aluminum oxide I may employ natural emery or corundum fines or the like. Likewise other substitute materials may be employed within the scope of my description and the appended claims. Also the proportions of raw materials employed may vary within wide ranges; however it is usually preferred that the volume of the disseminated material be at least of the general order of that of the matrix, or greater than that of the matrix material.

While I contemplate, wtihin the broad scope of my invention, the reacting of a mixture of garnet fines and aluminum oxide fines, or substitute materials, at a temperature sufficiently high so that substantially all of the aluminum oxide fines are fused, along with the garnet fines, it is much more preferable, particularly where it is desired to use my synthetic product as abrasive grits in coated abrasives such as sandpaper, to control the heat sufficiently low so that not more than a portion of the aluminum oxide fines will be fused, resulting in a material having partially fused and unfused aluminum oxide particles. I also contemplate employing a reacting temperature sufficiently low so that there will be substantially no fusion of the aluminum oxide fines. Additionally, I contemplate controlling the reaction so that fused garnet fines will react with the surfaces of disseminated aluminum oxide fines so that the quality of the resulting fused or vitrified matrix will be controlled and favorably influenced by virtue of said reaction.

While not an essential of the present invention, and while the invention is not at all limited thereto, where the nature of the desired product permits, it is frequently desired to employ aluminum oxide fines and garnet fines, or substitutes therefor, in such relation to each other as to attain or approximate eutectic proportions. Suitable proportions to accomplish this objective, and to make lower temperatures of treatments suitable, may be ascertained in any given case by any convenient known method.

While a number of other siliceous or silicon-bearing materials may be employed in place of or in lieu of garnet fines according to my present invention, it is desired not to employ a carbonaceous material such as silicon carbide because such material tends, perhaps because of a reducing action, to result in or produce a friable, inferior material. While it is possible to produce a product in which silicon carbide particles are disseminated in a fused matrix, such matrix commonly requires the use of extremely expensive materials, impractical in producing abrasives of commerce. Such possible materials would not be at all of the type of my products herein defined; nor would the matrix be of the type of fused or vitrified garnet fines.

A further virtue of my abrasive material is that, during use, as portions of abrasive particles become dulled, they break away, leaving exposed fresh studs or disseminated particles of aluminum oxide or equivalent, thereby automatically renewing the cutting surfaces of the abrasives, a factor which is important in abrasive articles generally, and especially in coated abrasives such as so-called sandpapers.

It will be understood that the above description is for the purpose of illustrating and not limiting the scope of the present invention.

What I claim is:

1. An abrasive grain comprising a fused or vitrified matrix having small size particles disseminated therein, said small size particles having a hardness substantially different from that of said matrix, and being predominantly of a particle size not greater than approximately 100 microns.

2. A synthetic abrasive grit or grain comprising a fused matrix having small sized particles disseminated therein, said small sized particles having a hardness substantially greater than that of said matrix.

3. An abrasive grain or grit comprising a vitrified matrix having finely divided, harder abrasive particles of unfused material disseminated therein, a substantial proportion of said harder abrasive particles having a size not greater than approximately 75 microns.

4. A synthetic abrasive grit or grain comprising the product resulting from heating together an intimate admixture of a non-carbonaceous siliceous material having a hardness not greater than about 7.5 (Mohs scale) and an alumina bearing material having a hardness of at least 9 (Mohs scale), the said alumina bearing material having a higher fusing point than said siliceous material, said abrasive grain or grit being produced at a temperature above the softening point of said siliceous material but below the point where said alumina bearing material would fuse to a large extent, the said abrasive grain or grit comprising an alumina material disseminated in a fused or vitrified matrix formed primarily from said siliceous material.

5. A synthetic abrasive grit or grain comprising the heat reaction product of garnet fines and aluminum oxide fines comprising a fused matrix composed predominantly of garnet fines, said matrix being studded with finely divided unfused aluminum oxide particles, disseminated therein.

6. A synthetic abrasive material having a fused matrix comprising garnet, with unfused aluminum oxide fines disseminated therein, said aluminum oxide fines being present in at least approximately as high a proportion by weight as said garnet, a large proportion of said disseminated aluminum oxide particles having a size within the range of 50 to 75 microns.

7. A synthetic coherent solid abrasive grain comprising the heat reaction product of an intimate admixture of finely divided garnet and aluminum oxide as reactants, produced at temperatures above the fusion point of said finely divided garnet but below the fusion point of said aluminum oxide.

8. An artificially prepared material for use as an abrasive comprising the product resulting from heating together an intimate admixture of garnet fines and aluminum oxide fines at a temperature above the fusion point of said garnet fines but below the fusion point of said aluminum oxide fines, e. g. at temperatures of the order of 1500° C., said aluminum oxide fines being present to the extent of approximately one and a half times that of said garnet fines, said fines being composed substantially completely of particles of a size not greater than 100 microns.

9. As a new article of manufacture, a bonded abrasive article comprising abrasive grits as defined in claim 5 bonded with an organic adhesive material.

10. As a new article of manufacture, a flexible abrasive article comprising a backing, a synthetic resinous binder coat, and a layer of abrasive particles as defined in claim 1 embedded in said binder coat and thus united with said backing.

11. As a new manufacture, a flexible abrasive article comprising an adhesive bonding coat having embedded therein a layer of synthetic abrasive grits or grains, said grits individually comprising a fused matrix having small size particles disseminated therein, said small size particles having a hardness substantially greater than that of said matrix and being predominantly of a size not greater than 100 microns.

JOHN A. BROWN.